United States Patent Office 3,254,949
Patented June 7, 1966

3,254,949
PROCESS FOR THE PRODUCTION OF ZIRCONIA
Abraham Clearfield, Niagara Falls, N.Y., assignor to National Lead Company, New York, N.Y., a corporation of New Jersey
No Drawing. Filed Oct. 8, 1962, Ser. No. 229,167
8 Claims. (Cl. 23—140)

The invention of this application relates to the production of zirconia products and is particularly concerned with a novel process for preparing crystalline hydrated zirconium dioxide and crystalline hydroxylated zirconium dioxide.

Three general types of methods are now in commercial use for producing zirconium dioxide (zirconia). In the first type, the oxide is produced at high temperatures by electric furnacing of zircon, a zirconium ore. The zirconia may be produced as a pig which must be crushed or as a fine powder by forming the so-called zirconium cyanonitride in the electric furnace and subsequently burning it to the oxide. The products obtained by this type of process are completely dehydrated and are relatively inactive.

In the second type of method the zirconia is produced by calcination at relatively high temperatures of a zirconium salt such as the sulfate or lactate. The products obtained, like the product referred to above, are dehydrated and relatively inactive.

The third general type of method involves the removal of water, and, in some cases, other substances from a hydrous precipitate such as hydrous zirconia or zirconium carbonate. By regulation of the dehydrating conditions the amount of residual combined water may be controlled and the incompletely dehydrated oxide is more active than those products produced by the first two methods mentioned. However, the products on drying are hard glassy masses and must be milled to obtain a fine powder.

It has now been found that finely divided, soft, relatively active, crystalline zirconia products may be prepared by an inexpensive, novel process. This process requires no handling of reacting solutions and precipitates and no crushing or milling of the products.

It is an object of the present invention to provide a process of the character described above.

Another object of the present invention is to provide a novel, convenient, and inexpensive process for preparing finely divided crystalline, hydrated and hydroxylated zirconia.

Another object of the invention is to provide a novel process for preparing a novel and efficient glass polishing material.

A further object of the invention is to provide novel crystalline, hydrated zirconia products.

Still another object of the invention is to provide novel glass polishing materials.

Other objects and advantages of the invention will be apparent from the following description.

Broadly, the present novel process comprises forming an essentially dry mixture of an alkali metal hydroxide with a zirconium compound selected from the group consisting of $ZrCl_4$, hydrolysis products of $ZrCl_4$ which have a Cl:Zr atomic ratio of at least 2:1, and mixtures thereof, applying heat to at least a portion of the mixture to initiate a reaction between the materials, washing from the reaction product alkali metal chloride formed by the reaction, and drying the residual zirconia product. Examples of the process with varying conditions and different reactants are given below.

*Example 1*

An intimate mixture of 93 parts of powdered $ZrCl_4$ and 64 parts of powdered NaOH was prepared. A heated rod was applied to the mixture and an exothermic reaction started which quickly spread throughout the mixture, a temperature of approximately 600° C. being reached therein. A vigorous evolution of steam occurred and HCl and some $ZrCl_4$ were also given off. After the mass cooled to room temperature, 250 parts of water was added and the reaction product was broken up and stirred to form a slurry. The slurry, which had a pH of greater than 14, was filtered. The filter cake was washed free of NaCl and dried at 110° C. The hydrated zirconia product was a fine, soft, crystalline powder which on examination by X-ray diffraction showed a pattern indicating approximately 80% cubic $ZrO_2$ and 20% monoclinic $ZrO_2$. The recovery of $ZrO_2$ was only 68.5% because of $ZrCl_4$ volatilized by the high temperature reaction.

*Example 2*

A mixture of 93 parts of $ZrCl_4$, 64 parts of NaOH and 135 parts NaCl, all in powdered form, was prepared and the reaction of $ZrCl_4$ with the NaOH was initiated with a heated rod. The reaction proceeded much more slowly than in Example 1 because of the NaCl diluent and the maximum temperature reached was only approximately 300° C. After about 250 parts of water was added to the reaction mass it was easily broken up and the NaCl washed out. The product, dried at 110° C., was a soft, fine, crystalline hydrated zirconium oxide powder with an X-ray diffraction pattern indicating approximately 80% cubic $ZrO_2$ and 20% monoclinic $ZrO_2$. The recovery of $ZrO_2$ was 97% of theoretical since very little $ZrCl_4$ was volatilized.

In the foregoing examples the mol ratio of NaOH to $ZrCl_4$ was about 4:1. Lower ratios may, however, be employed as shown in the following examples.

*Example 3*

An intimate mixture of 93 parts of $ZrCl_4$, 56 parts of NaOH, and 135 parts of NaCl, all in powdered form, was prepared. A heated rod was applied to the mixture to start the exothermic reaction which proceeded slowly through the mixture, a maximum temperature of about 300° C. being attained. The hydrated zirconia product obtained by washing out the NaCl from the reaction mass and drying the residue at 110° C. was substantially like the products of Examples 1 and 2. The recovery of $ZrO_2$ was 91% of the theoretical. The NaOH:$ZrCl_4$ mol ratio was 3.5:1.

*Example 4*

An intimate mixture of 93 parts of powdered $ZrCl_4$, 32 parts of powdered NaOH, and 93 parts of powdered NaCl was prepared and a reaction was started with a heated rod. The maximum temperature reached as the exothermic reaction spread through the mixture was about 450° C. After the reaction mass cooled it was broken up in water and the product after washing and drying at 110° C. was a fine, soft crystalline hydrated zirconia powder the X-ray diffraction pattern of which indicated approximately 90% cubic zirconia and 10% monoclinic zirconia. The recovery of $ZrO_2$ was 89.5% of theoretical. The NaOH:$ZrCl_4$ mol ratio was 2.0:1.

In Examples 2–4 sodium chloride was used as a diluent to moderate the reaction. Other inert, water soluble salts, such for example as potassium chloride or magnesium chloride, could also be used, of course, but sodium chloride is very cheap. Further, since NaCl is formed in the reaction the removal of the NaCl diluent presents no additional problems. Where, however, hydrolysis products of $ZrCl_4$ are used in carrying out the reaction no moderator is necessary. In the following examples the use of hydrolysis products of $ZrCl_4$ of various compositions is illustrated. In Example 5 the Cl:Zr atomic ratio is 2:1 while in Examples 6–8, inclusive, mixtures of $ZrCl_4$ and hydrolysis products having Cl:Zr atomic ratios greater than 2:1 are used.

Example 5

64 parts of granular zirconyl chloride octahydrate formed by hydrolysis of $ZrCl_4$ was thoroughly mixed with 20 parts of finely divided NaOH. The mixture was heated to 110° C. on a hot plate to start the exothermic reaction which then proceeeded to completion, a maximum temperature of approximately 150° C. being attained. The reaction product was broken up in water and washed free of NaCl to yield a somewhat agglomerated mass of crystalline hydrated zirconia powder. The mol ratio of $H_2O$ to Zr in this example was 8:1.

Example 6

A partially hydrolyzed $ZrCl_4$ product was formed by slowly stirring 21.7 parts of $H_2O$ into 93.6 parts of finely divided $ZrCl_4$. With this was thoroughly mixed 64 parts of NaOH. The reaction was started with a heated rod and proceeded slowly, a maximum temperature of about 150° C. being reached. The reaction product after washing and drying at 110° C. was a soft, crystalline, hydrated zirconia powder. In this example a 3:1 mol ratio of water to zirconium was used.

Example 7

The experiment of Example 6 was repeated using, however, 10.9 parts of water instead of 21.7 parts, a mol ratio of $H_2O$ to Zr of 1.5:1. The maximum temperature reached by the exothermic reaction was approximately 400° C. The final product was substantially identical with that obtained in Example 6.

Example 8

70.2 parts of powdered $ZrCl_4$ was mixed with 32.3 parts of finely divided $ZrOCl_2 \cdot 8H_2O$. A mild reaction ensued. After the reaction was complete 48 parts of powdered NaOH was added to the resultant hydrolysis products and thoroughly mixed in. A heated rod was applied to start the reaction which then proceeded at a moderate rate, a maximum temperature of approximately 250° C. being reached. When washed and dried at 110° C., the final product was found to be substantially like that obtained in Example 6. The water added in the $ZrOCl_2 \cdot 8H_2O$ was in such amount that the mol ratio of $H_2O$ to Zr in the second reaction was 2:1.

In Examples 5–8, inclusive, the yields were very good. In each example over 95% of the zirconium was recovered as hydrated zirconium oxide. In Examples 6 and 7 the amount of water used was insufficient to form zirconyl chloride and hence the atomic ratio of Cl:Zr in the hydrolysis products was greater than 2:1. As in Examples 1–4, inclusive, the final products of Examples 5–8, inclusive, were crystalline and more than 50% of the zirconia was in cubic form.

The crystalline hydrated zirconium oxide products thus obtained, although they are dry, free-flowing powders, contain up to about 15% water, the water content averaging about 8%. The water content varies from sample to sample as a result of variations in the conditions of preparation. When the crystalline hydrated zirconia is heated to about 350° C. water is lost and the water content of the products is found to range from about 3% to about 7%. It is believed that the major portion of this water is present as hydroxyl groups attached to zirconium atoms. Such hydroxyl groups are so tenaciously held by the zirconium that they can only be completely removed by calcination to temperatures of 900° C. or higher. Consequently even after calcining the crystalline hydrated zirconia to a temperature in the range from about 500° C.–800° C. the $H_2O$ content thereof is of the order of 5%–0.1%. As the water content of the products decreases they become progressively more like anhydrous zirconia and for many purposes the crystalline hydrated zirconia may be used for the same purposes as the anhydrous zirconia. In order to distinguish the slightly hydrated products from anhydrous zirconia, however, the term "hydroxylated zirconia" has been used by workers in the art to identify the zirconia which contains combined water in amounts of the order of 5%–0.1%. Upon heating the reaction products of Examples 1–8, inclusive, at 500° C.–600° C. crystalline hydroxylated zirconia was obtained in each case.

The crystalline hydrated zirconia products resulting from the present novel process are, as indicated above, powdered or granular materials. The products are generally finely divided and soft in texture and are substantially white. The slight color is a result of the presence of minute amounts of impurities. However, even though commercial grade $ZrCl_4$ is used as a reactant, the purity of the products obtained is quite high, the average metallic impurity content, excluding hafnium, being about 0.5%.

The range of particle size of the crystalline hydrated zirconia and crystalline hydroxylated zirconia as produced in accordance with the present invention is from below $0.5\mu$ to $15\mu$ with an average of about 70% of the particles being less than $5\mu$ and about 20% less than $0.5\mu$. The surface area of the products ranges from about 120 to about 40 sq. m./g. As is common with other hydrated materials the more water removed and the higher the calcination temperature the lower is the surface area. The products have a specific gravity in excess of 5, are insoluble in water and organic solvents, and are substantially insoluble in hydrochloric and nitric acids. They are, however, dissolved by prolonged treatment with hot, concentrated sulfuric acid.

The products obtained by carrying out the novel process of the present invention are unique not only because they consist of fine, soft particles with high surface area, but also because a major portion of each product exhibited an X-ray diffraction pattern characteristic of cubic zirconia. The production of cubic crystalline zirconia by calcination at temperatures up to 800° C. has not previously been reported. The cubic crystalline form of the hydroxylated zirconia described herein persists until the product is heated to about 695° C. at which point a transformation to the monoclinic form of the oxide begins.

In producing crystalline zirconia products in accordance with the novel process herein disclosed, there may be considerable variation from the examples. Thus the ratio of sodium hydroxide or other alkali metal hydroxide used may vary from about 2 to about 4 mols per mol of Zr. Somewhat higher and lower ratios may be used, but with more than a 4:1 molar ratio the hydroxide is wasted and excessive reaction temperatures result, while when less than a 2:1 molar ratio is employed the slurry formed by mixing the reaction products with water is acid and contains soluble zirconium which is lost. When sodium chloride is used as a moderator for the reaction, the amount used may range up to about 10 mols of NaCl per mol of Zr although a maximum mol ratio of about 6:1 is preferred. If other salts are used as moderators similar amounts are used.

It should be noted that although NaOH is much cheaper than any other alkali metal hydroxide, other alkali metal hydroxides may be used quite satisfactorily in carrying out the present process if there is any reason to do so.

The hydrated crystalline products obtained from carrying out Examples 1–8, inclusive, are quite efficient as glass polishing agents as shown by the following examples:

Example 9

Comparative polishing tests were made on glass lens blanks using the procedure described in U.S. Patent No. 2,955,031, issued Oct. 4, 1960, to Bliton et al. with the hydrated crystalline zirconia obtained from Example 2, above, and with a milled, fused zirconia of the type commercially sold for glass polishing. The particle sizes of the products compared were of the same order. It was found that in a ten minute test the commercial fused zirconia removed 65 mg. of glass while the hydrated crystalline zirconia removed 122 mg. of glass. Thus the latter is more than 85% more efficient in glass removal than the commercial product.

The hydrated crystalline zirconia dioxide obtained by the processes of Examples 1-8, inclusive, have also proved to be useful as adsorbants in chromatographic procedures. In addition, they can be used in catalysis and as active fillers in plastics. The hydroxylated crystalline zirconia derived from the products of Examples 1-8, inclusive, may also be used as glass polishing agents, catalyst, and fillers.

Further, as pointed out above, the crystalline hydrated products of the present invention may in some instances be used for the same purposes as anhydrous zirconia even though their high surface area and/or water content gives them unique usefulness for a variety of purposes. In this connection, it is to be noted that the hydrated products described herein may, if desired, be calcined to remove all water and thereby provide high purity, anhydrous, but unfused, zirconium oxide.

In the foregoing description of the present invention no account has been taken of the few percent of hafnium always associated with zirconium ores and compounds unless special effort is made to remove it. Since zirconium and hafnium are unique among the elements in that their chemical behaviors are almost identical and much more alike than those of any other two elements, such hafnium is not ordinarily regarded as an impurity and may be ignored. In the present case the hafnium goes through the same transformations as the zirconium.

All parts and percentages specified or referred to herein are parts and percentages by weight unless otherwise specified.

I claim:
1. A process of preparing a zirconium oxide product containing a substantial amount of cubic crystalline material as a dry, free-flowing powder containing up to about 15% water after drying at 110° C. which comprises the steps of preparing a dry mixture of an alkali metal hydroxide and a zirconium compound selected from the group consisting of $ZrCl_4$, hydrolysis products of $ZrCl_4$ which have a Cl:Zr atomic ratio of at least 2:1, and mixtures thereof, heating at least a portion of said mixture to a temperature at which an exothermic reaction is initiated which spreads throughout said mixture, after completion of the reaction, dissolving out the water soluble portion of the reaction products, and drying the remaining portion of the reaction product.

2. A process as set forth in claim 1 in which the alkali metal hydroxide is NaOH.

3. A process as set forth in claim 1 in which the alkali metal hydroxide is employed in a mol ratio of from 4:1 to 2:1 with respect to the zirconium.

4. A process as set forth in claim 1 in which a water-soluble inert, inorganic salt is used as a moderator of the reaction.

5. A process as set forth in claim 2 in which $ZrCl_4$ is employed as one of the reactants.

6. A process as set forth in claim 2 in which a hydrolysis product of $ZrCl_4$ which has a Cl:Zr atomic ratio of at least 2:1 is employed as one of the reactants.

7. A process as set forth in claim 2 in which a mixture of $ZrCl_4$ and hydrolysis products thereof which have a Cl:Zr atomic ratio of at least 2:1 is employed as one of the reactants.

8. A process as set forth in claim 5 in which sodium chloride is employed as a moderator.

References Cited by the Examiner
UNITED STATES PATENTS

| | | | |
|---|---|---|---|
| 1,582,126 | 4/1926 | Cooper et al. | 23—24.1 |
| 2,535,526 | 12/1950 | Ballard et al. | 51—309 |
| 2,783,126 | 2/1957 | Richter | 23—140 |
| 2,934,416 | 4/1960 | Harris et al. | 51—309 |
| 2,996,369 | 8/1961 | Harris et al. | 51—309 |
| 3,000,703 | 9/1961 | Brugger | 23—140 |
| 3,110,681 | 11/1963 | Meadows et al. | 23—140 XR |

FOREIGN PATENTS 327,142  3/1930  Great Britain.

OTHER REFERENCES

Azaroff et al.: The Powder Method in X-Ray Crystallography, McGraw-Hill Book Co., Inc., New York, 1958, p. 181.

Blumenthal: "The Chemical Behavior of Zirconium," D. Van Nostrand Co., Inc., New York, 1958, pp. 151-196 (pp. 157 and 181-186 of particular interest).

OSCAR R. VERTIZ, *Primary Examiner.*

MAURICE A. BRINDISI, *Examiner.*

H. T. CARTER, *Assistant Examiner.*